United States Patent [19]
Nagata et al.

[11] Patent Number: 5,452,428
[45] Date of Patent: Sep. 19, 1995

[54] PROCESSOR HAVING DIFFERENT OPERAND SOURCE INFORMATION TEMPORARILY STORED IN PLURAL HOLDING REGISTERS TO AVOID USING MICROPROGRAM ROM CAPACITY FOR SUCH INFORMATION

[75] Inventors: Miyuki Nagata; Tohru Utsumi, both of Yokohama, Japan

[73] Assignee: Kabushiki Kaisha Toshiba, Kawasaki, Japan

[21] Appl. No.: 372,838

[22] Filed: Jan. 13, 1995

Related U.S. Application Data

[63] Continuation of Ser. No. 88,583, Jul. 9, 1993, which is a continuation of Ser. No. 298,086, Jan. 18, 1989, abandoned.

[30] Foreign Application Priority Data

Jan. 18, 1988 [JP] Japan .................. 63-007033

[51] Int. Cl.⁶ .......................................... G06F 9/345
[52] U.S. Cl. ........................... 395/375; 395/800; 364/933.7; 364/DIG. 2
[58] Field of Search ............... 395/375, 400, 425, 800

[56] References Cited

U.S. PATENT DOCUMENTS

| | | | |
|---|---|---|---|
| Re. 32,493 | 9/1987 | Matsumoto et al. | 395/375 |
| 3,886,523 | 5/1975 | Ferguson et al. | 395/375 |
| 3,886,524 | 5/1975 | Appelt | 395/325 |
| 3,930,236 | 12/1975 | Ferguson et al. | 395/375 |
| 4,117,536 | 9/1978 | Bodner | 395/375 |
| 4,236,206 | 11/1980 | Strecker et al. | 395/375 |
| 4,392,198 | 7/1983 | Shimazaki | 395/400 |
| 4,685,080 | 4/1987 | Rhodes, Jr. et al. | 395/375 |
| 4,807,113 | 11/1989 | Matsumoto et al. | 395/375 |
| 4,812,972 | 3/1989 | Chastain et al. | 395/375 |
| 5,041,968 | 8/1991 | Yamaguchi | 395/725 |
| 5,046,040 | 9/1991 | Miyoshi | 395/375 |

FOREIGN PATENT DOCUMENTS 008785  9/1983  European Pat. Off.

OTHER PUBLICATIONS

Hidekazu Matsumoto et al., "A High-Performance Architecture for Variable Length Instructions", 8169 *Systems and Computers in Japan*, (1985) May–Jun. No. 3, Washington DC, USA, pp. 19–28.

*Primary Examiner*—William M. Treat
*Attorney, Agent, or Firm*—Foley & Lardner

[57] ABSTRACT

An information processing apparatus executes a machine language instruction according to a microprogram controlling method. The apparatus comprises an instruction decoder for decoding the machine language instruction; an operand controller for receiving from the instruction decoder, information about operands that are necessary in executing the machine language instruction, and fetching and holding the operands according to the information; and an instruction executing device generating operand requests to the operand controller, obtaining the operands, and executing the machine language instruction under the control of a microprogram. Thus, the apparatus can execute a plurality of machine language instructions that respectively prescribe the same operation to be carried out on the different kinds of operands, under the control of a single microprogram irrespective of the differences of the kinds of the operands.

14 Claims, 2 Drawing Sheets

PROCESSOR HAVING DIFFERENT OPERAND SOURCE INFORMATION TEMPORARILY STORED IN PLURAL HOLDING REGISTERS TO AVOID USING MICROPROGRAM ROM CAPACITY FOR SUCH INFORMATION

This application is a continuation of application Ser. No. 08/088,583, filed Jul. 9, 1993, which is a continuation of prior application Ser. No. 07/298,086, filed Jan. 18, 1989, now abandoned.

BACKGROUND OF THE INVENTION

1. Field of the Invention

The present invention relates to an information processing apparatus, and particularly to a microprocessor that operates under the control of a microprogram.

2. Description of the Prior Art

FIG. 1 is a view schematically showing construction of a conventional microprocessor based on the microprogram controlling method. The microprocessor processes machine language instructions accompanying plural kinds of operands such as register operands, memory operands and immediate operands.

Operation of the microprocessor will be described with reference to this figure.

A machine language instruction 1a is input to an instruction decoder 1 from an external source and decoded in the instruction decoder 1 to provide an internal instruction. The internal instruction has an instruction format which is executable in the processor. The internal instruction is output to and stored in an internal instruction register 2.

Generally, there are three kinds of operands, i.e., register operand, memory operand and immediate operand.

If a source of an operand is a register, a source register field SR of the internal instruction register 2 holds the number of the register in a general register set 3. If a destination of an operand is a register, a destination register field DR of the internal instruction register 2 holds the number of the register in the general register set 3.

An immediate data field IMM of the internal instruction register 2 is a region for storing numeric data.

If an operand is a memory operand, a field MA of the internal instruction register 2 holds the operand address in an external memory 4.

A microprogram storing block 5 is a region for storing microprograms for executing internal instructions. Information as to the kind of instruction processing, among the decoding result of the instruction decoder 1 is sent, as a first address of a microprogram to be used, to the microprogram storing block 5. According to the address sent, to block 5 respective microinstructions which constitute the microprogram are read from the microprogram storing block in order to execute the internal instruction.

The microinstruction read from block 5 is stored in a microinstruction register 6. The microinstruction held in the microinstruction register 6 is input to a micro-decoder 7. The micro-decoder 7 decodes the microinstruction and, according to a result of the decoding, generates operand requests.

According to the operand requests, operands needed for executing the machine language instruction are obtained on a local bus 8.

Conventional information processing apparatuses such as the microprocessor explained above have problems to be described below.

If the kinds of the operands or the kinds of the combinations of operands are different from each other, different microprograms should be prepared for respective cases even if the same kind of process is carried out. This may increase the number of steps for a microprogram, and push up labor and time necessary for developing the microprograms. Further, the necessary size of the microprogram storing block 5 is increased. And the increased size of the microprogram storing block 5 increases access time and deteriorates a machine language instruction processing efficiency. In addition, power consumption will be increased.

That is, in the case where an operand is in a register in the general register set 3, a microprogram that carries out the following process is used: the number of the register that is held in the field SR or DR of the internal instruction register 2 is selected by a selector 9 comprising memory 9a register 9b and inverter 9c and sent to the general register set 3. According to the register number sent, the register is selected from among the registers in the general register set 3. Then, the contents of the selected register are output to the local bus 8, or data on the local bus 8 are stored in the selected register.

If the operand is a source memory operand in the external memory 4, a microprogram that carries out the following process is used: The address that is held in the field MA of the internal instruction register 2 is selected by the selector 9, and the external memory 4 is accessed according to the address to provide data to a memory data register (MDR) 10. The data thus stored in the MDR 10 is output to the local bus 8.

If the operand is an immediate operand, a microprogram is used to output data stored in the field IMM of the internal instruction register 2 to the local bus 8.

In carrying out, for example, the following same adding process, different microprograms should be prepared for respective combinations of operands.

That is, if two operands are both register operands, the following two-step microprogram should be prepared:

—, YS, ASL, YD, ADL ADD, —, —, ALU, YD,
END        (1)

if one operand is a register operand and the other operand is an immediate operand, the following two-step microprogram should be prepared:

—, IMM, ASL, YD, ADL ADD, —, —, ALU, YD,
END        (2)

and if one operand is a memory operand and the other operand is an immediate operand, the following three-step microprogram should be prepared:

—, IMM, ASL, MDR, ADL ADD, —, —, ALU,
MDR —, —, —, —, —, MW, END        (3)

The representation YS, ASL, e.g., in the first microinstruction of the microprogram (1) corresponds to a process of transferring the content of a register whose number is stored in the field SR of the internal instruction register 2 to an arithmetic source logic register ASL 11 via the local bus 8. The representation YD, ADL corresponds to a process of transferring the content of a register whose number is held in the field DR of the internal instruction register 2 to an arithmetic destination logic register ADL 12 via the local bus 8. The representation ALU, YD in the second microinstruction corresponds to a process of transferring a result of the addition from an ALU 13 to the register whose number is held in the field DR of the internal instruction register 2, via the local bus 8.

SUMMARY OF THE INVENTION

An object of the present invention is to provide an information processing apparatus which can solve the above-mentioned problems of the conventional apparatuses. The apparatus of the present invention uses a single microprogram for executing plural machine language instructions which require the same kind of process to be carried out, but have different kinds of operands, respectively. The apparatus of the present invention remarkably reduces the labor of a micro programmer, and has a high processing speed.

In order to accomplish this object, an information processing apparatus of the present invention comprises an instruction decoder for decoding a machine language instruction, an operand controller for receiving information concerning operands necessary for executing the machine language instruction from the instruction decoder and fetching the operands according to the received information and holding the fetched operands, and an instruction executing unit for sending operand requests to the operand controller to obtain the operands, and executing the machine language instruction under the control of a microprogram.

These and other objects, features and advantages of the present invention will be more apparent from the following detailed description of preferred embodiments in conjunction with the accompanying drawings.

DETAILED DESCRIPTION OF THE PREFERRED EMBODIMENTS

Figure 1:
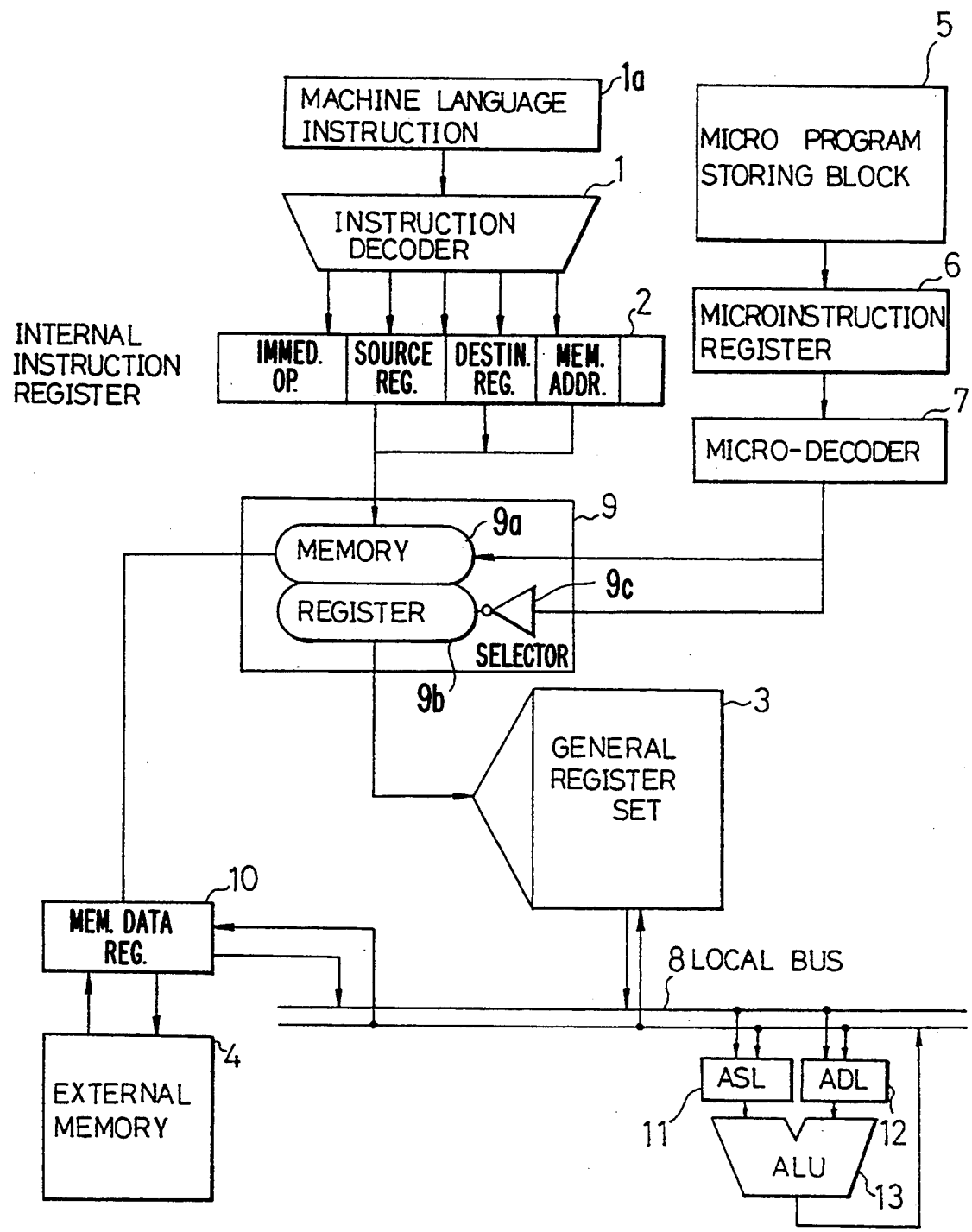
FIG. 1 is a block diagram showing a microprocessor using a microprogram controlling method according to the prior art.
Figure 2:
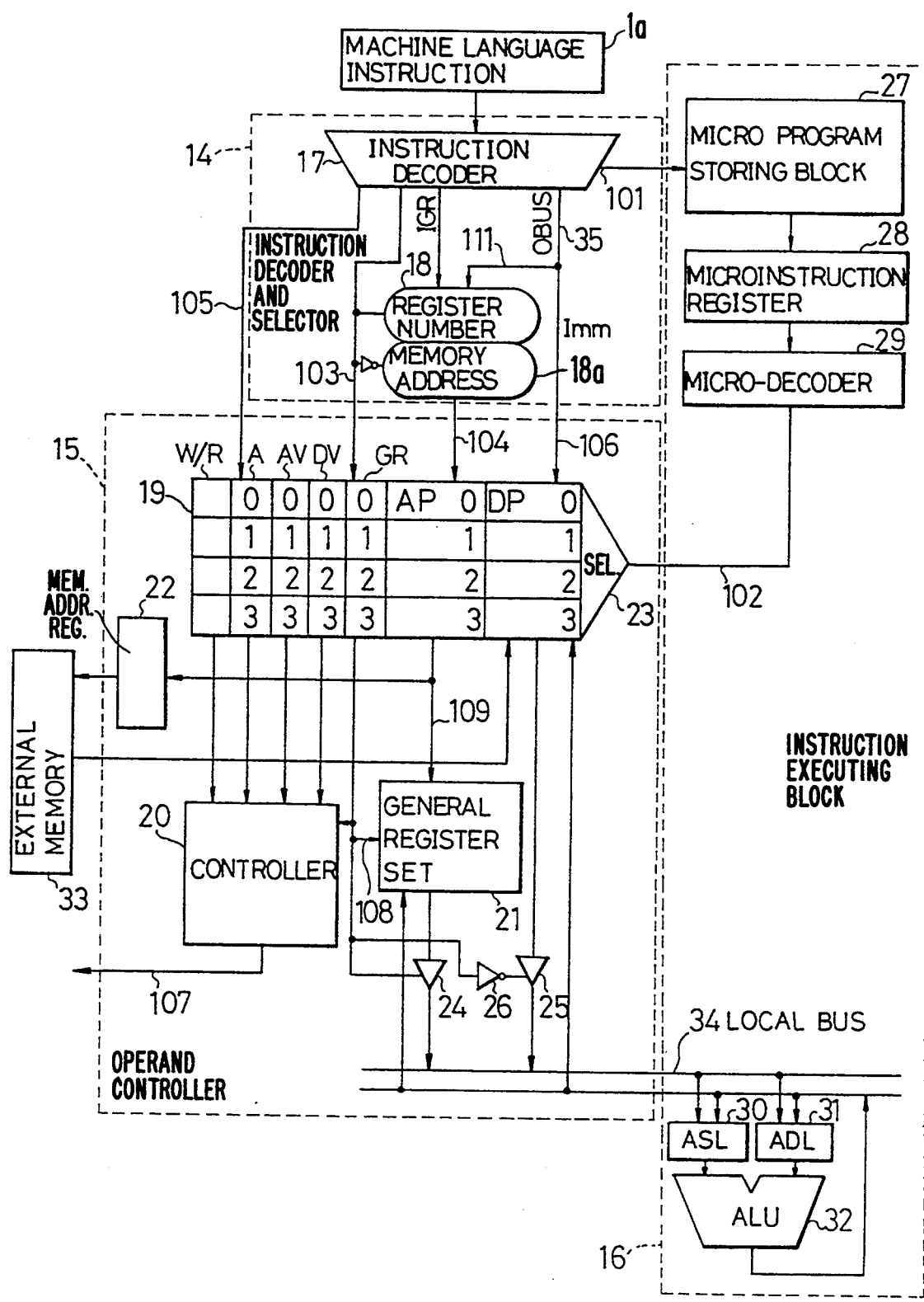
FIG. 2 is a block diagram showing a microprocessor according to an embodiment of the present invention.

FIG. 2 is a block diagram showing a microprocessor according to an embodiment of the present invention. As shown in the figure, the microprocessor of the embodiment comprises an instruction decoding block 14, an operand controlling block 15 and an instruction executing block 16.

The instruction decoding block 14 has an instruction decoder 17 a selector 18 and memory address unit 18a.

The operand controlling block 15 has four operand information holding units 19(0) to 19(3), a controller 20, a general register set 21, a memory address register (MAR) 22, a selector 23, buffers 24 and 25, an inverter 26, etc.

The instruction executing block 16 has a microprogram storing block 27, a microinstruction register 28, a micro-decoder 29, an ASL 30, an ADL 31, an arithmetic-logic unit (ALU) 32, etc.

Each of the four operand information holding units 19(0) to 19(3) comprises a 32-bit address operand data operand section AP for holding an operand address, a 32-bit section DP for holding operand data, and a plurality of bit sections GR, DV, AV, A and W/R for holding information concerning the kinds or the attributes of a operand stored in the operand information holding units. Meanings of the bits GR, DV, AV, A, and W/R will be explained.

If a value of the general register bit GR is 1, the operand information holding units in question is holding information about a register operand and, the section AP is holding the number of the register in the general register set 21. If the value of the bit GR is 0, the operand information holding units in question is holding information about a memory operand or an immediate operand.

If a value of the data valve bit DV is 1, the section DP of the operand information holding units in question is effectively holding data of the operand. If the value of the bit DV is 0, the section DP is not holding the data effectively.

If a value of the address valve bit AV is 1, the section AP of the operand information holding units in question is effectively holding an address in an external memory 33 or a register number in the general register set 21, of the operand. If the value of the bit AV is 0, the section AP is not holding such data effectively.

If a value of the access bit A is 1, access to the external memory 33 is requested in processing the operand held in the operand information holding units in question. If the value of the bit A is 0, there is no such an access request.

If a value of the write/read bit W/R is 1, the operand to be held in the operand information holding units in question is to be read from the external memory 33. If the value of the bit W/R is 0, the operand held in the operand information holding unit in question is to be written into the external memory 33.

The contents of the bits W/R, A, GR, AP and DP are set by the instruction decoder 17. Content of the section AP is set through the selector 18.

Operation of the microprocessor of the embodiment with the above-mentioned composition will be described.

A machine language instruction is read out of the external memory 33, input to the instruction decoder 17 and decoded in the decoder 17. Among the results of the decoding, data of operands used in processing the machine language instruction are sent to the operand controlling block 15.

Information 101, among the results of the decoding by the instruction decoder 17, concerning the kind of the process is sent to the microprogram storing block 27. The information 101 indicates the address of the microprogram, in the microprogram storing block 27, to be used for executing the machine language instruction.

The operands to be used in executing a machine language instruction fall among three kinds, i.e., memory operands, register operands and immediate operands.

The operand controlling block 15 stores the operands to be used in the execution of the machine language instruction which has been input in the instruction decoder 17, among the operand information holding units 19(0) to 19(3), irrespective of the kinds of the operands.

The operand information holding units which are not in use at that time are sequentially selected from the four operand information holding means to store the respective operand information. The selector 23 stores information about the sequence of the selection.

The machine language instruction is executed according to a pipeline process. Usually, when a machine language instruction is decoded by the instruction decoder 17 and the result of the decoding is about to be stored among the operand information holding units 19(0) to 19(3), several of the operand information holding units are already in use to hold operand data of a machine language instruction which has been decoded before and is being executed at the moment.

Operands which are needed in executing a machine language instruction are obtained on a local bus 34 by sending a selecting signal 102 for selecting operand information holding units from the instruction executing block 16 to the operand controlling block 15, irrespective of the kinds of the operands.

Among the decoded results, result 103 is an information that indicates whether or not the operand is a register in the general register set 21. The information 103 is set in the bit GR of the operand information holding units selected for holding data of the operand.

If the operand is a register in the general register set 21, internal general register register number IGR of the register in the general register set 21 is selected among the decoded results by the selector 18 and set in the 32-bit operand address storing section AP of the selected operand information holding units.

If the operand is a memory operand in the external memory 33, information about the operand address 111 in the external memory 33 is input in the selector 18 via an operand bus OBUS 35. Then, the address is selected by the selector 18 and stored in the section AP of the selected operand information holding units.

Namely, an output 104 of the selector 18 indicates an address of the operand in the external memory 33, or a register number in the general register set 21.

When data is set in the section AP of an operand information holding units, a value 1 is simultaneously set in the bit AV of the operand information holding units by the instruction decoder 17.

At this time, if the operand is a memory operand requiring access to the external memory 33, a value 1 is set in the bit A of the operand information holding unit by a signal 105.

If the operand is an immediate operand, immediate data (1 mm) 106 among the decoded results is set in the 32-bit operand data storing section DP of the operand information holding unit via the OBUS. At this time a value 1 is set in the bit DV.

In this way, the decoded results are set among the operand information holding unit. Then, the controller 20 operates as described below and judges whether or not the machine language instruction decoded in the instruction decoder 17 uses a memory operand. If it uses a memory operand, the memory operand is fetched.

The controller 20 checks the bits A and W/R of the operand information holding unit which have been selected newly to store the data from the instruction decoder 17. If the value of the bit A of an operand information holding unit is 1 and the value of the bit W/R of the same as 1, the controller 20 judges that there is a reading request for the memory and fetches the memory operand. Namely, the controller 20 outputs an address strobe signal 107 and starts memory access according to the operand address transferred to the MAR 22 from the section AP of the operand information holding unit. Memory data that was thus read from the external memory 33 is stored in the section DP of the operand information holding unit. At the same time, the bit DV is set to 1 and the bit A to 0.

By virtue of the four operand information holding units 19(0) to 19(3), a microinstruction can obtain the required operands only by sending a selecting signal 102 for selecting an operand information holding unit to the operand controlling block 15. After the input of the selecting signal 102, irrespective of the kinds of the operands, the operand controlling block 15 outputs operands required by the microinstruction to the local bus 34. Similarly, only by sending the selecting signal 102 for selecting the operand information holding unit to the operand controlling block 15, is a result of execution of the microinstruction stored in a correct area, whether it may be an area in the external memory 33 or a register of the general register set 21.

Namely, upon the reception of the source operand request from the microinstruction held in the microdecoder 29, the operand controlling block 15 selects one of the operand information holding unit according to the selecting signal 102. The selection is carried out by the selector 23 in the operand controlling block 15.

A value of the signal 102 for selecting an operand information holding unit sent from the microinstruction in the micro-decoder 29 is determined depending only on the kind of process and what order the selecting signal 102 occupies among such selecting signals that are generated in the execution of the microprogram corresponding to the machine language instruction, and it does not directly specify one of the operand information holding units.

Namely, which operand information holding unit corresponds the indirect specification of the microinstruction depends on the storing order of respective operand information that has been obtained by decoding the machine language instruction, among the four operand information holding units 19(0) to 19(3).

The selector 23 stores information about the storing order, and it selects, based on this information, the operand information holding unit that corresponds to the indirect specification from the microinstruction.

From the operand information holding unit thus selected, the operand required by the microinstruction is output to the local bus 34.

Namely, when the information held in the selected operand information holding unit relates to an external memory operand or an immediate operand, a value of the bit GR of the selected operand information holding unit is 0 so that the gate 24 is closed and the gate 25 opened. Through the gate 25, the contents of the section DP of the selected operand information holding unit, that is, the external memory operand or the immediate operand, in this case, is obtained on the local bus 34.

If the information held by the selected operand information holding unit relates to a register operand, the bit GR of the selected operand information holding unit has the value 1 so that the gate 24 is opened and the gate 25 closed in this case. Through the gate 24, the content of a register which has been selected among the general register set 21 according to the register number information stored in the section AP of the selected operand information holding unit, is output to the local bus 34. In this case, the value 1 of the bit GR is used as a signal 108 to start the above-mentioned selection of a register.

With the above-mentioned arrangement and control, a microinstruction can carry out its process on operands without, concern about the kinds of the operands. In other words, to execute a plurality of machine language instructions which correspond to the same kind of process but use different kinds of operands, respectively, only one microprogram needs to be prepared.

This will be explained with reference to an example of carrying out an adding process similar to the one explained in connection with the prior art.

In the microprocessor according to the embodiment of the present invention, the adding processes with different kinds of operands are carried out by one microprogram comprising the following two microinstructions:

—, DP1, ASL, DP2, ADL ADD, _,_, ALU, DP2, END   (4)

In the process defined by the microprogram (4), the sum of a source operand hold in the section DP of an operand information holding unit specified indirectly by DP1 and a source operand held in the section DP of an operand information holding unit specified indirectly by DP2 is operated upon in the ALU 32, and the result of the summation is stored in the section DP of the operand information holding unit specified indirectly by DP2. The operands are indirectly specified by the names DP1 and DP2, and there is no representation which is dependent of the kind of operand. Therefore, irrespective of the kinds of operands, the above-mentioned microprogram can carry out the adding process.

A result of a process set in a due area is described below.

For example, according to the microinstruction in the second line of the adding process (4) mentioned above, a result of the operation in the ALU 32 is stored in the section DP2 of the operand information holding unit designated by DP2. Further, if the bit A of the operand information holding unit designated by DP2 is 1, the result is stored in a memory cell whose address is set in the section AP of the same operand information holding unit. While, if the bit GR of the operand information holding unit designated by DP2 is 1, the result is stored in a register in the general register set 21 whose number is set in the section AP of the same operand information holding unit.

When the bit GR of the operand information holding unit designated by DP2 is 1, the general register set 21 is specified by the signal 108 so that the result from the ALU 32 is passed through the local bus 34 and set in a register which is specified by signal 109 from the section AP of the operand information holding unit. The signal 109 indicates a number of a register in the general register set 21.

After the completion of the execution of a microprogram, the controller 20 checks the bits A and W/R of the operand information holding unit which are in use for holding operand data of the machine language instruction under execution controlled by the microprogram. If there is an operand information holding unit in which the bit A has the value 1 and the bit W/R has the value 0, the controller 20 generates an address strobe signal 107 to write a value in the section DP of the operand information holding unit set in a destination region of the memory 33, using a value set in the section AP as an access address to the external memory 33.

In this way, by providing the operand controlling block with a controller, a predetermined number of the operand information holding units, etc., the instruction executing block no longer needs to be concerned with the kinds of operands. Namely, the operand controlling block acts as a buffer to prevent the instruction executing block from being influenced by the difference of the kinds of operands.

Therefore, a plurality of machine language instructions differing only in the kinds of operands used by them can be executed by a common microprogram, thus the total size of microprograms is remarkably reduced compared to the prior art technique. In addition, the labor of a microprogramer can be greatly reduced, and an area of a ROM for storing microprograms can also be reduced. As a result, power consumption is reduced, an access time to the ROM is reduced and processing speed is improved.

Although the embodiment has used four operand information holding units, the number is generally determined according to the maximum number of operands to be used for one machine language instruction and process. Namely, it will be useless to provide the operand information holding unit with more than is necessary. However, if there are too few, troubles such as the deterioration of process efficiency or impossibility processing may occur. Therefore, an optimum number, in the meaning described above, of the operand information holding units should be provided. This number can be easily obtained, e.g., by a simulation.

While the invention has been described in its preferred embodiment, it is to be understood that the words that have been used are words of description rather than limitation and that various changes and modifications may be made within the purview of the appended claims without departing from the true scope and spirit of the invention in its broader aspects.

For example, it is possible to prepare in each operand information holding unit, two address parts for holding a memory address and register number, respectively.

What is claimed is:

1. A microprogram controlling method for executing machine language instructions by using microprograms, said method comprising the steps of:

decoding a machine language instruction in a decoding means, and obtaining information specifying a microprogram to be used for executing said machine language instruction, information about operands to be used for execution of said machine language instruction and information including an operational code which is common to machine language instructions differing only in an operand source;

sending said information about said operands to operand controlling means and storing said information about said operands in said operand controlling means, said operand controlling means storing at least an immediate operand and an address of a memory as information about operands of a single machine language instruction at the same time;

checking by said operand controlling means to see whether or not information about memory operands exists among said information about said operands stored in said operand controlling means;

if it is judged by said checking step that information about a memory operand is held in said operand controlling means, carrying out a plurality of operand fetch operations for one microinstruction by accessing an external memory according to said information about said memory operands and fetching said memory operands for said operand controlling means;

sending said information specifying said microprogram to microprogram storing means;

reading a microinstruction constituting said microprogram from said microprogram storing means according to said information specifying said microprogram;

sending an operand request signal which does not depend on the kind of operand from said microinstruction to said operand controlling means; and outputting a requested operand to a local bus from said operand controlling means according to said operand request signal.

2. A microprogram controlling method for executing machine language instructions by using microprograms, said method comprising the steps of:

decoding a machine language instruction by a decoding means, and obtaining first information specifying a microprogram to be used for executing said machine language instruction and second information about operands to be used in execution of said machine language instruction, said second information including information concerning whether each operand is a memory operand, a register operand or an immediate operand, an address in a memory if said operand is a memory operand and an identification number in a register set if said operand is a register operand;

storing said second information about said operands in selected ones of operand information holding means, in such a way that a value of an immediate operand, if any, is stored in a first predetermined section of one of said operand information holding means selected for holding said information about said immediate operand, and wherein said immediate operand is stored in a second predetermined section in one of said operand information holding means at the same time an address of a memory is stored in a predetermined section in another of said operand information holding means;

checking by memory access controlling means to see whether or not said information stored in any of said selected ones of said operand information holding means relates to memory operands;

if an operand information holding means is judged by said checking step to be holding information which relates to said memory operands, controlling memory access by said memory access controlling means by carrying out a plurality of operand fetch operations for one microinstruction by accessing said memory according to a memory address of said memory operands stored in said operand information holding means, and fetching said memory operands for said operand information holding means;

sending said first information specifying said microprogram to a microprogram storing means;

reading a microinstruction constituting said microprogram from said microprogram storing means according to said first information;

sending an operand request signal which does not depend on the kind of operand, from said microinstruction to selecting means which stores information about a selection carried out in selecting several ones out of a predetermined number of said operand information holding means to store information about said operands;

selecting by said selecting means, an operand information holding means which holds information about an operand specified by said operand request signal; and if a selected operand information holding means is holding information about a memory operand or an immediate operand, outputting said value of said operand stored in said first predetermined section of said selected operand information holding means to a local bus, and, if said selected operand information holding means is holding information about a register operand, sending an identification number of a register stored in a second predetermined section of said selected operand information holding means to a register set, selecting said register from said register set according to said identification number, and outputting the contents of said register to said local bus, thereby obtaining said operand requested by said microinstruction on said local bus.

3. A processor for microprograms comprising:

an instruction decoder for decoding a machine language instruction and outputting a decoded machine language instruction including an operational code which is common to machine instructions differing only in an operand source and outputting a starting address of a microinstruction corresponding to said operational code;

a memory for storing said microprograms and for outputting a series of microinstructions in response to said starting address of said microinstruction corresponding to said operational code of said decoded machine language instruction outputted from said instruction decoder;

a micro-decoder for decoding microinstructions of said series of micro instructions outputted from said memory and outputting control signals;

operand information holding means for receiving information from said instruction decoder and for holding said information about a plurality of operands of said decoded machine language instruction outputted from said instruction decoder indicative of addresses of said operands and indicative of operand sources from which said operands should be fetched, said operand information holding means holding at least an immediate operand and an address of a memory of the machine language instruction at the same time; and controlling means for selectively carrying out a plurality of operand fetch operations from general registers and/or from an external memory for one microinstruction in accordance with said information about said operands transferred from said holding means upon receipt of said control signals outputted from said micro-decoder.

4. The processor as claimed in claim 3, wherein there are a predetermined number of said operand information holding means for holding said information about said operands.

5. The processor as claimed in claim 4, wherein said controlling means comprises selecting means for storing information concerning which of said operands is to be used in executing said machine language instruction which is stored in said operand information holding means, for receiving an operand selecting signal from said micro-decoder, and selecting one of said operand information holding means which holds information about an operand specified by said operand selecting signal according to said information concerning which of said operands is to be used in executing said machine language instruction which is stored in said operand information holding means.

6. The processor of claim 3, wherein said operand information holding means comprises a plurality of registers, each register of said registers containing information about one operand.

7. The processor of claim 6, wherein each register of said registers of said operand information holding means holds bits indicative of operand data, bits indicative of an address of an operand, a bit indicative of whether or not a required operand exists in one of said general registers and a bit indicative of whether or not access to said external memory is required.

8. A processor for microprograms comprising:
an instruction decoder for decoding a machine instruction and outputting a decoded machine instruction including an operational code which is common to machine instructions differing only in an operand source;
a memory for storing said microprograms and outputting a series of microinstructions in response to a starting address of a microinstruction corresponding to said operational code of said decoded machine instruction outputted from said instruction decoder;
a micro-decoder for decoding a microinstruction outputted from said memory and outputting a control signal;
a predetermined number of operand information holding means for receiving from said instruction decoder and respectively holding information about operands of said decoded machine instruction outputted from said instruction decoder indicative of addresses of said operands and indicative of an operand source from which said operands should be fetched, said operand information holding means storing an immediate operand and an address of a memory of the machine instruction at the same time, wherein each of said operand information holding means includes
  a first information holding section for holding information concerning whether or not memory access is needed concerning an operand held in a respective operand information holding means,
  a second information holding section for holding information concerning whether said memory access needed is a reading access or a writing access,
  a third information holding section for holding information concerning a memory address, which is used in said memory access, of an operand held in a respective operand information holding means if said operand held in said respective operand information holding means is a memory operand and for holding information about a register number if said operand held in said respective operand information holding means is a register operand,
  a fourth information holding section for holding information about validity of a value of an operand held in said operand information holding means,
  a fifth information holding section for holding information concerning whether said information held in said third information holding section is valid or invalid, and
  a sixth information holding section for holding information concerning whether said information held in said third information holding section concerns said memory address or said register number; and controlling means for alternatively carrying out an operand fetch operation from general registers or an external memory in accordance with said information about one of said operands transferred from said operand information holding means upon receipt of said control signal outputted from said micro-decoder.

9. The processor as claimed in claim 8, wherein said controlling means comprises:
memory access controlling means for
  receiving information held in said first and second information holding sections of each of said operand information holding means,
  reading said memory according to information held in said third information holding section of said operand information holding means if there is a memory reading request in a respective operand information holding means, and
  setting a result of reading said memory in said fourth information holding section of said operand information holding means.

10. An apparatus for executing instructions comprising:
an instruction decoder for decoding a machine language instruction in sequence to generate a first decoded signal including information about a plurality of operands and a second decoded signal indicative of a microprogram executable using said plurality of operands, wherein said plurality of operands is obtained in accordance with said information, and wherein said information for each of said plurality of operands including at least one of an immediate operand, an operand address or a register number;
storing means, connected to said instruction decoder, for receiving and storing said information about said plurality of operands from said instruction decoder, said storing means being capable of storing said information for each of said plurality of operands of the machine instruction including an immediate operand and an address of a memory at the same time;
a microprogram storing block connected to said instruction decoder for storing microprograms and outputting microinstructions in sequence in accordance with said second decoded signal;
a microinstruction register connected to said microprogram storing block for holding microinstructions;
a micro-decoder connected to said microinstruction register for decoding a microinstruction in sequence and generating a plurality of control signals for executing said microprograms;
a selector connected to said storing means and said micro-decoder for receiving a control signal from said micro-decoder and controlling said storing means to selectively output to said controller said information about said plurality of operands for executing said microinstructions decoded by said micro-decoder;
a controller connected to said storing means for providing operands on a local bus based on said information; and
an arithmetic logic unit connected to said local bus for executing microinstructions based on said operands.

11. The apparatus as claimed in claim 10, wherein said means stores a first information bit of said information, indicative of whether a corresponding operand is stored in a general register.

12. The apparatus as claimed in claim 10, wherein said means stores second information bits of said information, indicative of whether the items of said information contains a valid operand.

13. The apparatus as claimed in claim 10, wherein said means stores third information bits of said information, indicative of whether the items of said information contain a valid address of a corresponding operand.

14. The apparatus as claimed in claim 10, wherein said means stores a fourth information bit of said information, indicative of whether a corresponding operand is stored in an external memory.

* * * * *